Feb. 18, 1964 G. E. PARRETT 3,121,774

GAIN REGULATING ARRANGEMENT FOR CARRIER CURRENT TELECOMMUNICATION SYSTEM

Filed Dec. 28, 1960 2 Sheets-Sheet 1

United States Patent Office 3,121,774

Patented Feb. 18, 1964

3,121,774
GAIN REGULATING ARRANGEMENT FOR CARRIER CURRENT TELECOMMUNICATION SYSTEM

Geoffrey Eric Parrett, Taplow, England, assignor to British Telecommunications Research Limited, Taplow, England, a British company Filed Dec. 28, 1960, Ser. No. 78,982
Claims priority, application Great Britain Dec. 31, 1959
9 Claims. (Cl. 179—170.4)

Figure 1:
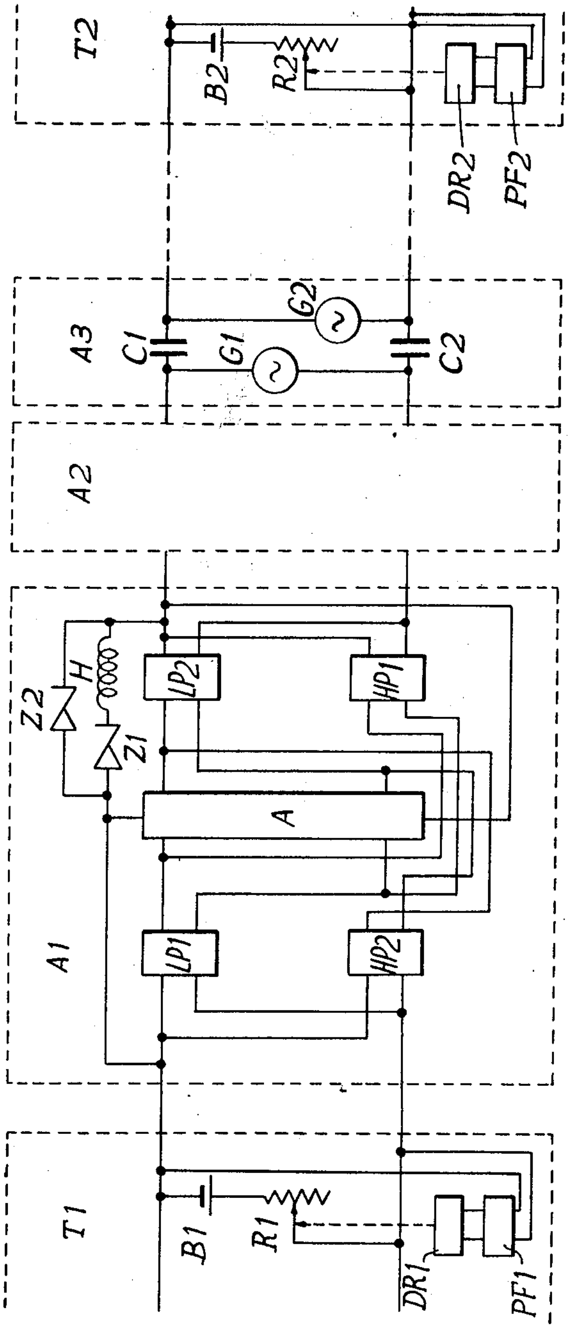

The present invention relates to electrical signalling systems and is more particularly concerned with telecommunication systems in which intelligence is transmitted by carrier currents over a cable between two terminal stations.

As is well known, if the system comprises a large number of carrier channels so that a comparatively wide frequency band is involved, it is necessary to provide repeater stations at comparatively short intervals along the cable. Moreover for satisfactory commercial working, means must be provided for adjusting the gain of the amplifiers at the various repeater stations in accordance with variations in the transmission characteristics of the cable, so that the end-to-end loss is substantially constant. Regulating devices for this purpose are conveniently classed as dynamic, for instance involving valves or transistors and using a pilot frequency and comparison standard, or static, for instance where thermistors are used to monitor the local cable temperature and adjust the gain of the amplifier accordingly. Dynamic regulators are more complicated and consume more power so that it is usually desirable for them to be located at an attended station where they can receive the necessary maintenance. Static regulators, on the other hand, seldom give trouble and can therefore be satisfactorily located at an unattended station which may be buried.

It is convenient in many cases to supply the various repeater stations by power transmitted over the cable. It has already been suggested that this power should be supplied on a substantially constant current basis but that slight changes should be made by a dynamic regulator at the feeding terminal station, and that these changes should control gain regulating networks at the intermediate stations, so giving dynamic regulation with distributed correction for the whole power-fed section. The dynamic regulators may be controlled by pilot current transmitted to the feeding terminal station and applied at a predetermined level.

On an extensive system however, it may not be possible or convenient to feed power from one terminal station only and it may be necessary to feed from both terminal stations with a so-called turn-around point about the middle of the route. With power feeding from both ends however, it is necessary to transmit pilots in both directions and hence to provide dynamic regulators at each end of the line in order to be able to control the two separate feed currents. A little consideration will show that with this arrangement the system will tend to become unstable, since with the use of both-way amplifiers, which is assumed, the pilot current in each direction passes through amplifiers which are controlled by the other pilot current. This confuses the two correcting functions and renders the system unworkable. The expression "both-way amplifier" refers to an arrangement in which the Go and Return paths employ different frequency bands and by the use of suitable high- and low-pass filters, a common amplifier may be used for both directions of transmission. The chief object of the invention is to provide an improved arrangement whereby the advantages outlined above are secured but at the same time a satisfactory stability is achieved.

According to the invention this is brought about by arranging that the pilot frequency level always has the same predetermined value at the power turn-around point. This can most conveniently be achieved by locating the pilot generators at this point, but other means may also be used. For instance, the pilot frequency generators may be located at the terminal stations, as is the more usual practice, but the dynamic regulators located at the turn-around point. This achieves the same object since it is the primary function of such regulators to ensure that the pilot level always has a predetermined value at the input to such regulators. The preferred arrangement however, is to locate the pilot generators at the turn-around point since these are likely to require less maintenance than the dynamic regulators.

In a modification aimed at producing this same effect, it is arranged that neither the dynamic regulators nor the pilot generators are located at the turn-around point and that the equipment which needs to be provided at this point is likely to operate satisfactorily for long periods without maintenance attention. According to this arrangement, only one pilot generator is employed and this is situated at one of the terminal stations, while the other pilot frequency is derived from the first by equipment at the turn-around point. This comprises a frequency-changer, a pair of filters and a local oscillator and thus the only active equipment at this point is the local oscillator. In the circumstances of its use however, it is not important that it should be highly accurate in either amplitude or frequency so that, even if it tends to lose its adjustment in course of time, it will still operate satisfactorily. The effect of the frequency changer is to enable a different frequency to be transmitted back to the original terminal station for the purpose of gain regulation thereat. This frequency is preferably so low that it is substantially unaffected by the variations in transmission characteristics of the cable, but that its amplitude is dependent on that of the pilot current of much higher frequency received at the turn-around point. Such small variations as occur in the level of the low frequency transmitted back can be taken care of by suitable design and adjustment of the associated dynamic regulator.

The invention will be better appreciated from the following more detailed description of the above two methods of carrying it into effect which should be taken in conjunction with the accompanying drawings. Of these, FIG. 1 shows diagrammatically an example of the arrangement first referred to in which the pilot generators are located at the turn-around point and FIG. 2 shows the arrangement in which frequency changing is effected at the turn-around point and only a single pilot generator is required which is located at one of the terminal stations.

Figure 2:
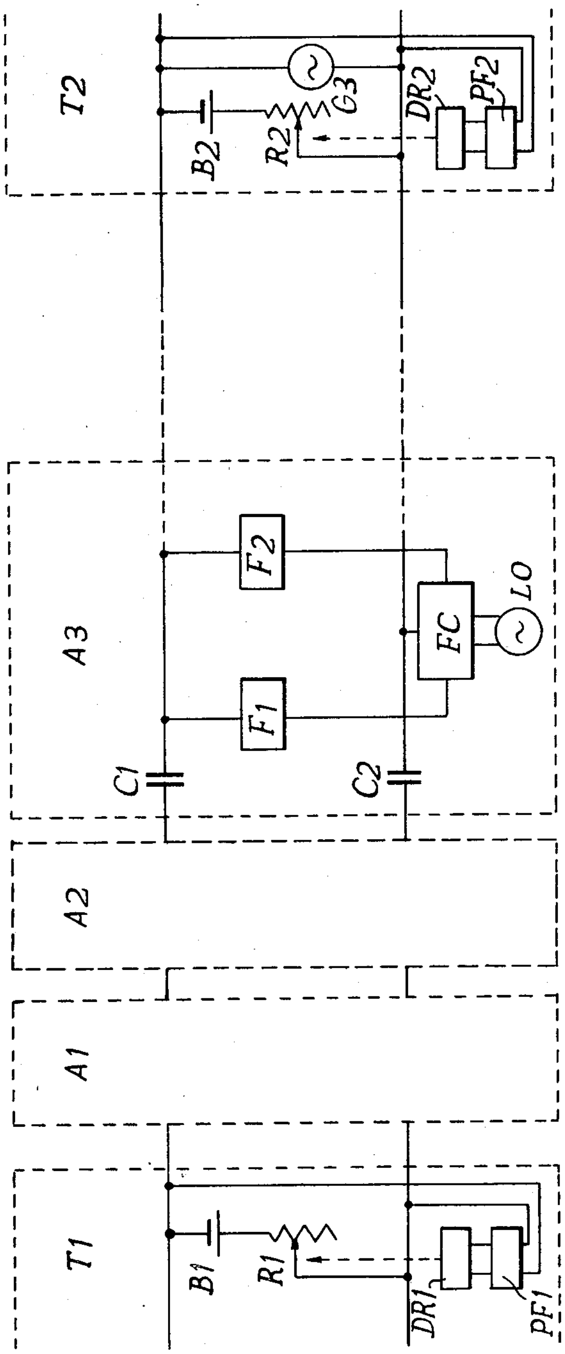

Considering first FIGURE 1, this shows diagrammatically a signalling cable extending between the terminal stations T1 and T2. It is assumed to pass through intermediate repeater stations A1, A2 and A3 of which A3 is somewhere near the middle of the line and serves as the turn-around point. Thus, power feeding to the stations A1, A2 and A3 and any further stations which may need to be included is from the terminal station T1 where the power source is represented by the battery symbol B1. Similarly terminal station T2 feeds a number of intermediate stations assumed to be located between T2 and A3. The arrangement of the both-way amplifier A at station A1 is shown diagrammatically in association with the various filters. It is assumed that a low frequency band is used for transmission in the direction T1–T2 so that signals transmitted from the station T1 pass through the low-pass filter LP1 to the amplifier A and then through the low-pass filter LP2 to the succeeding station. Similarly signals transmitted from T2–T1 in the high frequency band pass through the high-pass filter HP1 to the input to the amplifier A and from the output of the amplifier to the high-pass filter HP2 and thence to terminal station T1. It is assumed that the other intermediate stations are arranged on the same basis.

The division between the two feeding systems in station A3 is diagrammatically illustrated by the capacitors C1 and C2 located in the main transmission leads which thus isolate the two direct current supplies. The pilot generator G1 is connected across the signalling leads in the station A3 and produces a frequency *f*1 which will need to be passed by the high-pass filters HP1 and HP2. This pilot frequency is extracted by the pilot frequency filter PF1 at the terminal station T1 and supplied to the dynamic regulator DR1 which then adjusts the feed current as necessary, for instance as shown diagrammatically in FIG. 1 by means of a slider on the resistor R1. In a similar way the pilot frequency generator G2 at the station A3 produces a frequency *f*2 which is passed by the low pass filters in the various intermediate stations and this is extracted at the terminal station T2 by the pilot frequency filter PF2 and operates the dynamic regulator DR2 which accordingly adjusts the feed current from the source represented by the battery symbol B2 by way of the slider on the resistor R2. It will be seen that with this arrangement each pilot frequency is only effectively transmitted over a single power feed section and consequently there is no question of any amplifier being controlled by two pilot frequencies. Accordingly the system has no tendency to instability and operates to give the required adjustments as referred to above.

If one of the pilot frequency generators should become faulty, it is possible to work temporarily with a generator of the same frequency in a terminal station such that pilot transmission will take place in the same direction. Thus, if generator G1 providing frequency *f*1 should become faulty, the system could still be kept working if a similar generator of frequency *f*1 were connected up in the terminal station T2. For the reasons pointed out above however, it is not possible to maintain the system in operation if both generators are faulty.

Though present-day repeaters are not unduly sensitive to supply voltage variations, they cannot tolerate large changes without altering their characteristics appreciably. If full advantage is to be taken of the regulating possibilities of the distributed correction scheme, therefore, the feed current may need to vary outside the limits for consistent operation of the amplifier. This point may be taken care of by arranging that the thermistor, which following a known practice, effects the regulation is shunted across the amplifier in series with a Zener diode. This ensures, if the values are suitably chosen, that in spite of the variations of feed current to which the thermistor responds, the voltage across the amplifier and hence the current through it, remains substantially constant. This is shown in the typical station A1 in FIG. 1 where the thermistor heater winding is represented by H and it is connected across the amplifier (including the filters) in series with a Zener diode Z1. The winding H is of comparatively low resistance so that the voltage stabilising effect of the Zener diode is not appreciably impaired. The additional Zener diode Z2, which will have a slightly different characteristic, is provided as a precaution to maintain the stabilising effect in case the heater winding H should become open-circuited. Though this would result in the failure of the gain control in the station in question, it would not put the system out of action and sufficiently satisfactory operation might be possible for some time before the fault was disposed of.

Considering now the arrangement of FIGURE 2, this is generally similar to FIGURE 1, though in this case the intermediate station A1 is only shown as a block and more equipment is shown in the turn-around station A3 since this is where the local oscillator is assumed to be located. It will be assumed in this case that the system makes use of four super groups of which Nos. 1 and 2 are transmitted from the terminal station T1 to terminal station T2, while Nos. 4 and 5, which are of higher frequency, are transmitted from T2 to T1. The band of frequencies corresponding to super group No. 3 is not used for traffic, as this band is required to give adequate separation between the high and low pass filters which are employed so that a common amplifier for both directions may be used.

Stations T1 and T2 are provided as before with dynamic regulators DR1 and DR2 respectively responsive to the pilot frequencies and the single pilot generator G3 is located at the station T2. The frequencies which may conveniently be employed are set out in the following table:

| Supergroup No. | Carrier Frequency (kc.) | Frequency Range (kc.) |
|---|---|---|
| 1 | 612 | 60-300 |
| 2 | 864 | 312-552 |
| 3 | 1,116 | 564-804 |
| 4 | 1,364 | 812-1,052 |
| 5 | 1,612 | 1,060-1,300 |

With this choice of frequencies, the frequency *f*1 produced by generator G3 may be 1364 kc./s. which is also the carrier frequency for supergroup 4 but lies above the frequency range of supergroup 5. This frequency by operating regulator DR1 by way of a filter PF1 serves for regulating the gain on the portion of route between the turn-around point in station A3 and the terminal station T1. The frequency changer is assumed to have the effect of changing the pilot frequency from 1364 kc./s. to 50 kc./s. and this frequency *f*2 is then transmitted back to station T2 and serves for operating the regulator DR2 thereat in respect of the portion of route between station A3 and station T2. The equipment at the turn-around point in station A3 comprises the local oscillator LO, which with the figures assumed would produce a frequency of 1414 kc./s., a frequency changer FC and two filters F1 and F2 corresponding respectively to the frequencies 1364 kc./s. and 50 kc./s. With this arrangement, the only active equipment at the turn-around point is the local oscillator which as already pointed out need not be of critical frequency or amplitude since it is readily possible to design a frequency changer the output of which is proportional to the input and is substantially independent of the local oscillator amplitude. The amplitude variations of the returned low frequency pilot at 50 kc./s. will be therefore the variations encountered by the 1364 kc./s. pilot as a result of its transmission to the turn-around point from station T2.

The low frequency of 50 kc./s. is substantially unaffected by the changes in transmission characteristics of the cable but in so far as these take place, they can be catered for by suitable design and adjustment of the dynamic regulator DR2. The regulators DR1 and DR2 will need a certain amount of maintenance and this can be conveniently provided as they are located at the terminal stations and similarly the generator G3 of the original pilot frequency of 1364 kc./s. is also located at a terminal station.

In the event of failure of the frequency changer or local oscillator, it is possible to set the first half of the route on manual gain control and at suitable intervals to adjust this gain in accordance with information relayed from station T1 over the so-called speaker channel until the necessary repairs have been made.

It will be understood that the arrangement just described is equally applicable to systems in which one or more intermediate feeding stations are employed. In this case the original pilot currents may pass through these intermediate feeding stations so that only a single pilot generator at one of the terminal stations is required. The return frequency employed may be different at each turnaround point but it is also possible to use the same return frequency throughout if a filter which will not pass this frequency is located at each intermediate feeding station concerned.

I claim:

1. In a carrier current signalling system, a pair of terminal stations, a signalling cable extending between said terminal stations, a plurality of repeater stations spaced along said cable, an amplifier in each repeater station, means for feeding power on a substantially constant current basis over said cable from said first terminal station to a first group of consecutive repeater stations comprising substantially half the total number, means for feeding power on a substantially constant current basis over said cable from said second terminal station to a second group comprising the remainder of said repeater stations, a first dynamic gain regulator at said first terminal station, a second dynamic gain regulator at said second terminal station, means for transmitting pilot current of one frequency from the last repeater station fed from said first terminal station to said first terminal station to effect the variable operation of said first gain regulator dependent on the transmission characteristics of the corresponding portion of said cable, means operated by said first gain regulator for varying the feed current to said first group of repeater stations, means in each repeater station of said first group for altering the gain of the associated amplifier responsive to said variation, means for transmitting pilot current of another frequency from the last repeater station fed from said first terminal station to said second terminal station to effect the variable operation of said second gain regulator dependent on the transmission characteristics of the corresponding portion of said cable, means operated by said second gain regulator for varying the feed current to said second group of repeater stations, and means in each repeater station of said second group for altering the gain of the associated amplifier responsive to said variation.

2. In a carrier current signalling system, a pair of terminal stations, a signalling cable extending between said terminal stations, a plurality of repeater stations spaced apart along said cable, an amplifier in each repeater station, means for feeding power on a substantially constant current basis over said cable from said first terminal station to a first group of consecutive repeater stations comprising substantially half the total number, means for feeding power on a substantially constant current basis over said cable from said second terminal station to a second group comprising the remainder of said repeater stations, a first dynamic gain regulator, a first source of pilot current of a first frequency, means for transmitting pilot current from said first source over the portion of said cable between said first terminal station and the last repeater station fed therefrom to effect the variable operation of said first gain regulator dependent on the transmission characteristics of said portion of said cable, means operated by said first gain regulator for varying the feed current to said first group of repeater stations, means in each repeater station of said first group for altering the gain of the associated amplifier responsive to said variation, a second dynamic gain regulator, a second source of pilot current of a second frequency, means for transmitting pilot current of said second frequency from said second source over the portion of said cable between said second terminal station and the last repeater station fed from said first terminal station to effect the variable operation of said second gain regulator dependent on the transmission characteristics of said portion of said cable, means operated by said second gain regulator for varying the feed current to said second group of repeater stations and means in each repeater station of said second group for altering the gain of the associated amplifier responsive to said variations.

3. A carrier current signalling system as claimed in claim 2 in which the amplifier in each repeater station is shunted by a Zener diode in series with the heating winding of a thermistor which constitutes the gain adjusting device.

4. In a carrier current signalling system, a pair of terminal stations, a signalling cable extending between said terminal stations, a plurality of repeater stations spaced apart along said cable, an amplifier in each repeater station, means for feeding power on a substantially constant current basis over said cable from said first terminal station to a first group of consecutive repeater stations comprising substantially half the total number, means for feeding power on a substantially constant current basis over said cable from said second terminal station to a second group comprising the remainder of said repeater stations, a first dynamic gain regulator at said first terminal station, a first source of pilot current of a first frequency located at the last repeater station fed from said first terminal station, means for transmitting pilot current from said first source to effect the variable operation of said first gain regulator dependent on the transmission characteristics of the intervening portion of said signalling cable, means operated by said first gain regulator for varying the feed current to said first group of repeater stations, means in each repeater station of said first group for altering the gain of the associated amplifier responsive to said variation, a second dynamic gain regulator located in said second terminal station, a second source of pilot current of a second frequency located in the same repeater station as said first pilot current source, means for transmitting pilot current of said second frequency from said second source to effect the variable operation of said second gain regulator dependent on the transmission characteristics of the intervening portion of said signalling cable, means operated by said second gain regulator for varying the feed current to said second group of repeater stations and means in each repeater station of said second group for altering the gain of the associated amplifier responsive to said variation.

5. In a carrier current signalling system, a pair of terminal stations, a signalling cable extending between said terminal stations, a plurality of repeater stations spaced apart along said cable, an amplifier in each repeater station, means for feeding power on a substantially constant current basis over said cable from said first terminal station to a first group of consecutive repeater stations comprising substantially half the total number, means for feeding power on a substantially constant current basis over said cable from said second terminal station to a second group comprising the remainder of said repeater stations, a first dynamic gain regulator at said first terminal station, a source of pilot current of a first frequency located at said second terminal station, means for transmitting pilot current from said source to effect the variable operation of said first gain regulator dependent on the transmission characteristics of the intervening portion of said signalling cable, means operated by said first gain regulator for varying the feed current to said first group of repeater stations, means in each repeater station of said first group for altering the gain of the associated amplifier responsive to said variation, a second dynamic gain regulator located in said second terminal station, a frequency changer producing a second frequency and located in the last repeater station fed from said first terminal station, means for transmitting pilot current of said second frequency from said frequency changer to effect the variable operation of said second gain regulator dependent on the transmission characteristics of the intervening portion of said signalling cable, means operated by said second gain regulator for varying the feed current to said second group of repeater stations and means in each repeater station of said second group for altering the gain of the associated amplifier responsive to said variation.

6. A carrier current signalling system as claimed in claim 5 in which said first and second pilot frequencies are so selected as to lie on opposite sides of the frequency band used for the transmission of intelligence.

7. A carrier current signalling system as claimed in claim 5 in which said frequency changer is arranged to produce an output of said second frequency proportional to the input of said first frequency and said second frequency is chosen to be sufficiently low that its amplitude is substantially unaffected by variations in the transmission characteristics of said signalling cable.

8. In a carrier current signalling system as claimed in claim 5, an intermediate feeding station, means for transmitting pilot current of said first frequency from said second terminal station to said first terminal station, a frequency changer at each turnaround point, all said frequency changers being arranged to produce pilot current of said second frequency and a filter at said intermediate feeding station arranged to stop currents of said second frequency.

9. In a carrier current signalling system, a pair of terminal stations, a signalling cable extending between said terminal stations, a plurality of repeater stations spaced apart along said cable, an amplifier in each repeater station, means for feeding power on a substantially constant current basis over said cable from said first terminal station to a first group of consecutive repeater stations comprising substantially half the total number, means for feeding power on a substantially constant current basis over said cable from said second terminal station to a second group comprising the remainder of said repeater stations, a first dynamic gain regulator at said first terminal station, a source of pilot current of a first frequency located at said second terminal station, means for transmitting pilot current from said source to effect the variable operation of said first gain regulator dependent on the transmission characteristics of the intervening portion of said signalling cable, means operated by said first gain regulator for varying the feed current to said first group of repeater stations, means in each repeater station of said first group for altering the gain of the associated amplifier responsive to said variation, a second dynamic gain regulator located in said second terminal station, an oscillator and a frequency changer both located at the last repeater station fed from said first terminal station and arranged to co-operate to produce pilot current of a second frequency in response to receipt of pilot current of said first frequency, means for transmitting said pilot current of said second frequency to effect the variable operation of said second gain regulator dependent on the transmission characteristics of the intervening portion of said signalling cable, means operated by said second gain regulator for varying the feed current to said second group of repeater stations and means in each repeater station of said second group for altering the gain of the associated amplifier responsive to said variations.

References Cited in the file of this patent

UNITED STATES PATENTS

| | | |
|---|---|---|
| 2,060,843 | Abraham | Nov. 17, 1936 |
| 2,272,735 | Bishop | Feb. 10, 1942 |
| 2,350,951 | Zinn | June 6, 1944 |